(No Model.)
T. B. JEFFERY.
PNEUMATIC TIRE.
No. 523,283.  Patented July 17, 1894.
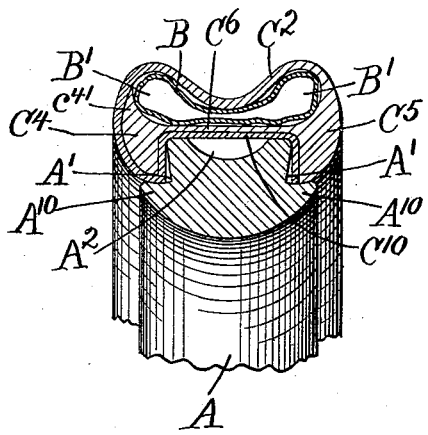
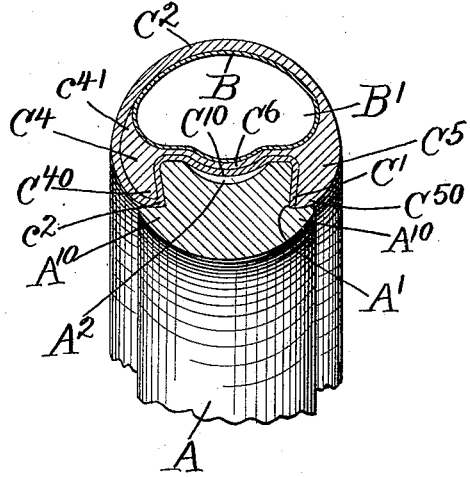
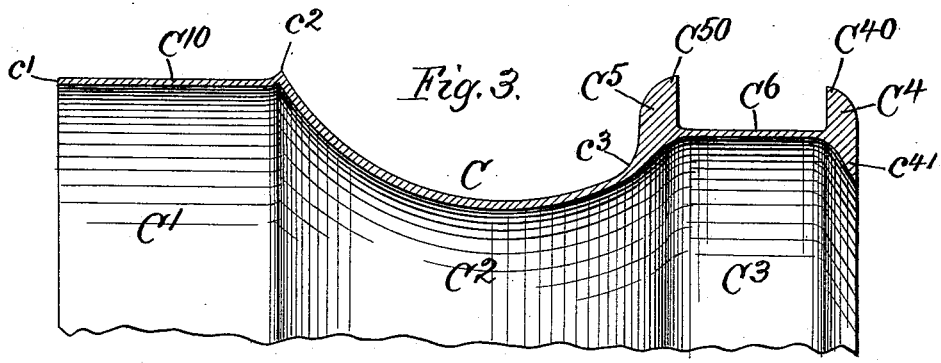
Witnesses.
E. T. Wray.
Jn̄o Elliott
Thos B. Jeffery
Inventor.

UNITED STATES PATENT OFFICE.

THOMAS B. JEFFERY, OF CHICAGO, ILLINOIS.

PNEUMATIC TIRE.

SPECIFICATION forming part of Letters Patent No. 523,283, dated July 17, 1894.

Application filed March 26, 1894. Serial No. 505,070. (No model.)

*To all whom it may concern:*

Be it known that I, THOMAS B. JEFFERY, a citizen of the United States, residing at Chicago, county of Cook, and State of Illinois, have invented certain new and useful Improvements in Pneumatic Tires, which are fully set forth in the following specification, reference being had to the accompanying drawings, forming a part thereof.

This invention relates to pneumatic tires, and is intended especially to provide a tire of that class adapted to be applied upon the outside of the rim of the wheel, and to embrace rather than to be embraced by the rim. And in detail, it consists in providing the sheath or cover for the inflatable core with a portion which is adapted to clasp or stride the periphery of the rim, and to clasp within it, between itself and the rim, the opposite edge or side portion of the cover itself, the clasping portion being so formed that the pressure of the core when inflated, makes it grip the rim of the wheel and the web of the cover which is lodged between it and the rim.

In the drawings,—Figure 1 is a transverse section of the wheel rim and tire thereon embodying my invention, the tire being shown with the core uninflated. Fig. 2 is a similar view showing the core inflated. Fig. 3 is a sectional plan of a short piece of the tire cover unfolded or unrolled in the form in which it is molded.

A is the wheel rim. Preferably, it is rabbeted at the sides at $A'$ $A'$, but this is not at all essential to the operation of the invention. When it is rabbeted, however, the horizontal shoulders $A^{10}$ $A^{10}$ help to sustain the tire, receiving a part of the pressure of the load when the wheel is traveling.

B is the core of an ordinary inflatable rubber endless tube.

C is the tire cover. It may be made in any convenient manner, but I have preferred to make it upon a drum or cylinder in the form of an endless band, of which a piece is shown in Fig. 3. It will be made of textile fabric saturated and covered with rubber in a well-known manner not necessary to explain or illustrate. The portion $C'$ is intended to be folded over the periphery of the rim, as seen in Figs. 1 and 2, the edge $c'$ being lodged in the angle of one of the rabbets $A'$, and the angle $c^2$ being lodged in the angle of the opposite rabbet. The portion $C^2$ constitutes the exposed portion of the tire, the side which is shown concave in Fig. 3 being the outer side, which is convex transversely with respect to the tire when on the wheel and inflated. It is molded in this form for two reasons, one of which is that thereby the curve at $c^3$ is easy, and the liability of rupture in folding or rolling it into the cylindrical form of the completed tire is reduced. Another reason will be hereinafter stated. The portion $C^3$ constitutes the clasp or key or clamp which bites the portion $C'$ over the periphery of the rim. This brings the thickened portion $C^4$ into the curve or fold of the portion $C^2$, outward from the angle $c^2$, the corner $C^{40}$ falling into the angle $c^2$, and the corner $c^{41}$ projecting upward as seen in Figs. 1 and 2. The thickened portion $C^5$ stops the rabbet on the opposite side, and clasps the extreme edge of the portion $C'$, the angle $C^{50}$ coinciding with the extreme edge of the portion $C'$, and lodging on the shoulder of the rabbet on that side. In folding or rolling the tire cover into this form on the wheel, the core will be enwrapped in it, as seen in Fig. 1, and the normal curvature of the part $C^2$ will cause it to be depressed in the middle,—that is, its curvature will not be reversed in the mere enfolding process, and the appearance of the tire may before inflation be somewhat as shown in Fig. 1.

When the inflation of the core is commenced, the resistance of the portion C to the interior pressure tending to reverse its curvature, will cause the core to be first inflated in the lateral portions $B'$ $B'$, and such inflation producing pressure outwardly against the upwardly extending horns of the thickened portions $C^4$ and $C^5$, will force the lower portions,—to-wit, the angles $C^{50}$ and $C^{40}$ inward, and make them bind hard against the part $C'$, which they enwrapped and clasped between themselves and the side of the rim. The grip of the part $C^3$ of the cover on the part $C'$ of the same, and of both these parts upon the rim will be secure before the inflation of the core is completed, and the further inflation tending to and finally resulting in the complete reversing of the curvature of the part $C^2$, will increase this grip. In addition to the outward expansion producing the grip described, the complete inflation tends to depress the portions of the cover which extend across the periphery of the rim,—to-wit, the middle portion of the part C', indicated by $C^{10}$, and the part between the thickened portions $C^4$ and $C^5$ indicated by the letter $C^6$; and if, as is preferable, the periphery of the rim has been hollowed as shown in $A^2$, these portions $C^6$ and $C^{10}$ will be sunk into the depression, and the two side portions thus directly pulled together against the lateral surfaces of the rim.

All of the features of construction co-operating in the manner described cause this tire to be very firmly held by the mere inflation of the core within it onto a rim which it clasps, and it is therefore adapted to be applied to ordinary buggy wheels and wheels having wood fellies which are liable to be split by a core whose inflation produces an outward or rupturing pressure rather than an inward or clamping pressure, as the one here shown.

I claim—

1. In combination with the rim and the inflatable core, the cover wrapped about the core with its lateral portions overlapping at the inner circumference, the overlap extending entirely across the periphery of the rim and overhanging the same at both sides, whereby, upon the inflation of the core, the rim is laterally gripped between the overhanging portions: substantially as set forth.

2. In combination with the rim and the inflatable core, the cover folded about the rim and having its lateral portions lapping each other at the inner circumference, the overlap extending entirely across the periphery of the rim and overhanging both sides, the inner of such overlapping portions having thickened ribs which extend outwardly in the plane of the wheel at both sides of the core, whereby the inflation of the core operating against said thickened portions crowds them outwardly, and causes said portions to press inwardly against the sides of the rim: substantially as set forth.

3. In combination with the rim and the inflatable core, a tire cover adapted to be wrapped or folded about the core, one lateral portion lapping within the other, the interior lapping portion having thickened ribs adapted to clasp the rim, and the opposite lateral portion of the cover folded on the rim: substantially as set forth.

4. A tire cover in the form of an endless band for an inflatable tire comprising the portions C' $C^2$ and $C^3$, the portion $C^2$ being normally convex inwardly, and the portion $C^3$ having the recess $C^6$ opening outwardly, whereby, when applied upon the rim, the inflation of the core reverses the curvature of the part $C^2$; substantially as set forth.

In testimony whereof I have hereunto set my hand, in the presence of two witnesses, at Chicago, Illinois, this 21st day of March, 1894.

THOS. B. JEFFERY.

Witnesses:
   JEAN ELLIOTT,
   E. T. WRAY.